Patented Oct. 20, 1942

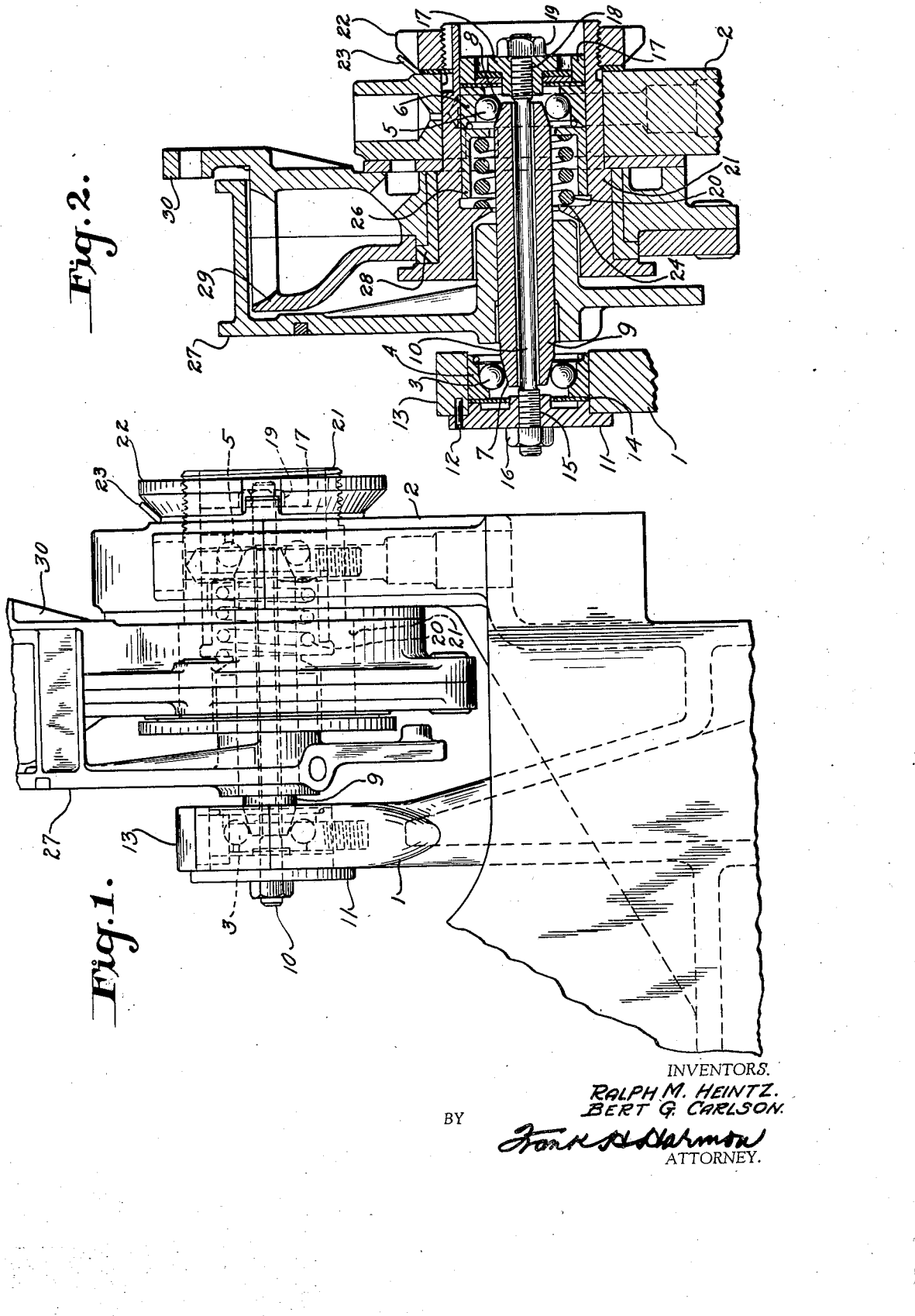

2,299,231

UNITED STATES PATENT OFFICE 2,299,231

COMPENSATOR ARRANGEMENT FOR BEARING AND JOURNAL ASSEMBLIES IN AUTOMATIC GYRO CONTROL PILOTS

Ralph M. Heintz, Cleveland, and Bert G. Carlson, Erieside, Ohio, assignors to Jack & Heintz, Inc., Cleveland, Ohio Application January 10, 1942, Serial No. 426,288

5 Claims. (Cl. 308—197)

This invention relates to improvements in journal bearings for shafts and has for an object to provide temperature compensation means for maintaining constant bearing clearances for the shaft over a wide range of temperature conditions.

One of the greater difficulties experienced in the provision of bearing assemblies in castings with spaced journal boxes has been the maintenance of constant bearing clearances under extreme temperature conditions and this is especially true when the castings are of a material such as aluminum or magnesium having a relatively high coefficient of expansion such as are found in such instruments as gyroscopic assemblies for automatic pilots.

With this in view, it is proposed to secure one steel bearing assembly in one magnesium casting wall and have the other resiliently urged away from the first wall and slidably arranged with respect to the second wall while the two bearing assemblies are maintained on the bearing surfaces of the shaft by means of a tension strut extending, with clearance, through the shaft and the bearing assemblies. The bearing clearances may be properly adjusted under normal temperature conditions by placing the retaining strut under a proper degree of tension. In this manner the variations in expansion and contraction of the materials of the casting and shaft due to temperature conditions are compensated for resiliently by the interposed spring and hence constant bearing clearances are maintained over wide temperature ranges.

With the foregoing and other objects in view, the invention resides in the new and novel method and means of assembly and in the combination and details of parts hereinafter set forth in the following specification and appended claims, certain embodiments thereof being illustrated in the accompanying drawing, in which:

Figure 1 is a view in side elevation through the casting showing the bearing assemblies and the bearing surfaces in dotted lines.

Figure 2 is a view in longitudinal vertical section taken through the assembly shown in Figure 1.

Referring more particularly to the drawing, the casting may be made of light metal such as aluminum or magnesium and comprise a relatively short and thin wall 1 and a relatively long and thick wall 2 to receive the two bearing assemblies. The two ball bearing assemblies comprise balls 3 and their race 4 and balls 5 and their race 6. The two ball bearing assemblies have their balls 3 and 5 urged into engagement with the bearing surfaces 7 and 8 of the shaft 9 by means of an adjustable rigid tension strut 10 which extends, with clearance, through the shaft and the two bearing assemblies. At one end of the shaft at the wall 1 the strut extends through a plate 11 which embraces the wall 1 and is secured by means of a pin 12 to a bearing cap 13, there being interposed a suitable washer 14 between the adjacent faces of the plate 11 and bearing race 4. The strut is screwthreaded at 15 into plate 11 and locked by a lock-nut 16 which bears against the plate 11 when the nut is tightened on the strut.

At the other end of the shaft at the wall 2 the strut 10 is threaded into plate 17 and is screwthreaded at 18 to receive a lock-nut 19 which bears against the plate 17 when the nut is tightened on the strut. As distinguished from the fast relationship between the bearing race 4 and the wall 1, the bearing race 6 is mounted to be longitudinally slidable against the action of a compression spring 20 within a stationary steel barrel 21 which extends through the wall 2 and is adjustably secured by a nut 22 and lock washer 23 against longitudinal movement toward the left, as viewed in Figure 2. This barrel is provided with an inwardly extending flange 24 against which the compression coil spring 20 bears and this spring is otherwise caged by a flanged sleeve 26 that is slidably arranged within the barrel 21. In this arrangement the spring 20 tends to urge the ball bearing assembly, including the balls 5, outwardly toward the right, as viewed in Figure 2.

The particular construction shown as one embodiment and application of the invention further includes a rotatable member 27 carried by the shaft 9 and which is made of light metal having a relatively high coefficient of expansion. This member 27 may carry a pointer, not shown, for an automatic pilot, while the assembly including the steel barrel 28 and magnesium elements 29 and 30 carried thereby, are manually rotatable with respect to the steel barrel 21.

In such instruments as pointers for automatic pilots as may be carried by the rotatable element 27 involving highly delicate and sensitive physical responses, it is highly important to maintain constant bearing clearances for the shaft 9 that carries it. In the arrangement shown and described, the assembly is adjusted in the position shown in Figure 2 by the tensioning of the strut 10 by the plates 11 and 17 until the desired bearing clearances are obtained at normal temperature. Under abnormal temperatures there will be a tendency for the two walls 1 and 2 to either diverge or converge according to the high or low temperature condition and the degree thereof. However, by means of the present new and novel means and method of construction and assembly these variations in temperature conditions are automatically compensated for and constant bearing clearances are maintained. This is accomplished by reason of the fact that during convergence or divergence of the two walls any tendency of longitudinal displacement of either ball bearing assembly with the corresponding adjacent bearing surfaces of the shaft is resisted by the action of the spring. In other words, as specifically applied to the ball bearings 5, during movement of the wall 2 to the right, any tendency for the ball 5 and ball race 6 to move with the wall 2 is absorbed by the spring 20 by a compressing action thereon, so that as the wall 2 moves a floating action on the assembly which includes the flanged sleeve 26, balls 5, race 6 and plate 17 will yield to the left, independent of the fixed barrel 21. The bearing clearances of balls 3 and 5 relative to the shaft 9 are thus undisturbed and maintained in constant spaced relationship to each other upon the shaft 9. Likewise, during any movement of the wall 2 to the left, the floating assembly members are urged to the right, relative to the member 21, by the action of the compression spring 20 bearing outwardly or in opposite relation of the movement of the wall 2, thus again maintaining a constant spaced relationship of the balls 3 and 5 and relative to the shaft 9.

The same action holds true for any independent action of the wall 1 as the floating assembly members are tied to the wall 1 by the tension strut 10 and the interposition of the compression spring 20. When the wall 1 moves to the left, the floating assembly will slidably follow in the chamber 21. The member 21 and wall 2 remain stationary in this instance. Constant bearing clearances are thus obtained and maintained throughout any converging or diverging action of the walls 1 and 2 or during temperature responses of the walls.

We claim:

1. In combination in a casting having a plurality of supports for a rotatable shaft and bearing assemblies carried by said supports for said shaft, one of said bearing assemblies being fixed with respect to one of said supports and the other bearing assembly being slidable with respect to the other support longitudinally of said shaft, and means for compensating for temperature conditions over a relatively wide range and for maintaining constant bearing clearances between said bearing assemblies and said shaft, said means comprising a spring interposed between said bearing assemblies and a rigid tension strut extending, with clearance, through said shaft, bearing assemblies and supports and adjustment means on said strut for placing the same under tension and providing the desired predetermined bearing clearances between said bearing assemblies and said shaft against the action of said spring.

2. In combination in a casting having a plurality of supports for a rotatable shaft and bearing assemblies carried by said supports for said shaft, one of said bearing assemblies being fixed with respect to one of said supports, a sleeve fixed to a second support to receive a second bearing assembly in slidable relation longitudinally of said shaft, and means for compensating for temperature conditions over a relatively wide range and for maintaining constant bearing clearances between said bearing assemblies and said shaft, said means comprising a caged spring interposed between said sleeve and said second bearing assembly tending to urge the latter longitudinally out of engagement with the adjacent shaft bearing surface, a rigid tension strut extending, with clearance, through said shaft, bearing assemblies and supports and adjustment means on said strut for placing the same under tension and providing the desired predetermined bearing clearances between said bearing assemblies and said shaft against the action of said spring.

3. In combination in a gyro control device having a casting with a plurality of supports for a rotatable shaft and bearing assemblies carried by said supports for said shaft, one of said bearing assemblies being fixed with respect to one of said supports and a second bearing assembly being slidable with respect to a second support longitudinally of said shaft, and means for compensating for temperature conditions over a relatively wide range and for maintaining constant bearing clearances between said bearing assemblies and said shaft, said means comprising a spring for normally urging said second bearing assembly longitudinally out of engagement with the adjacent shaft bearing surface, a rigid tension strut extending, with clearance, through said shaft, bearing assemblies and supports and adjustment means on said strut for placing the same under tension and providing the desired predetermined bearing clearances between said bearing assemblies and said shaft against the action of said spring, a control carrier mounted to rotate with said shaft and an adjustable setting device mounted so as to rotate about and with respect to said shaft.

4. In combination in an automatic pilot having a casting with a plurality of supports for a rotatable shaft and bearing assemblies carried by said supports for said shaft, one of said bearing assemblies being fixed with respect to one of said supports, a sleeve fixed to a second support to receive a second bearing assembly in slidable relation longitudinally of said shaft, and means for compensating for temperature conditions over a relatively wide range and for maintaining constant bearing clearances between said bearing assemblies and said shaft, said means comprising a spring interposed between said sleeve and said second bearing assembly tending to urge the latter longitudinally away from said first bearing assembly, a rigid tension strut extending, with clearance, through said shaft, bearing assemblies and supports and adjustment means on said strut for placing the same under tension and providing the desired predetermined bearing clearances between said bearing assemblies and said shaft against the action of said spring, a control valve member mounted to rotate with said shaft and an adjustable setting device mounted on said sleeve so as to be rotatable about the same.

5. In combination with a pair of supports, a ball bearing assembly carried by each of said supports, a rotatable shaft having bearing surfaces in engagement with said bearing assemblies, one of said bearing assemblies being fixed with respect to one of said supports and, the other bearing assembly being slidable with respect to the other support longitudinally of said shaft, and means for maintaining constant bearing clearances between said bearing assemblies and said shaft over a relatively wide range of temperature conditions, said means comprising a spring interposed between one of said bearing assemblies and supports to normally urge said bearing assembly longitudinally away from the other, a rigid tension strut extending freely through said shaft, bearing assemblies and supports and adjustment means on said strut for placing the same under tension and providing the desired predetermined bearing clearances between said bearing assemblies and said shaft against the action of said spring.

RALPH M. HEINTZ.
BERT G. CARLSON.